(12) United States Patent
Parsian et al.

(10) Patent No.: US 12,669,215 B2
(45) Date of Patent: Jun. 30, 2026

(54) ACCESSORY DEVICES FOR SECURING ELECTRONIC DEVICES TO VARIOUS STRUCTURES

(71) Applicant: Apple Inc., Cupertino, CA (US)

(72) Inventors: Mohammadali Parsian, San Mateo, CA (US); John Wadsworth, Burbank, CA (US); Mitchell Davis Suckle, Long Beach, CA (US); Oliver Seil, Long Beach, CA (US); Paer Saangloef, Los Angeles, CA (US); Tom Hee Kwon, Gardena, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 18/407,392

(22) Filed: Jan. 8, 2024

(65) Prior Publication Data

US 2024/0401738 A1     Dec. 5, 2024

Related U.S. Application Data

(60) Provisional application No. 63/470,747, filed on Jun. 2, 2023.

(51) Int. Cl.

| | |
|---|---|
| *F16M 11/10* | (2006.01) |
| *F16M 11/04* | (2006.01) |
| *F16M 11/06* | (2006.01) |
| *F16M 11/12* | (2006.01) |
| *F16M 13/02* | (2006.01) |

(Continued)

(52) U.S. Cl.
CPC ........ *F16M 13/022* (2013.01); *F16M 11/041* (2013.01); *F16M 11/125* (2013.01); *F16M 11/06* (2013.01); *F16M 11/10* (2013.01);

*F16M 2200/068* (2013.01); *H04M 1/0279* (2013.01); *H04M 1/21* (2013.01)

(58) Field of Classification Search
CPC ............ Y10S 248/917; Y10S 248/918; Y10S 248/919; F16M 11/06; F16M 11/10; F16M 13/00
USPC ....... 248/459, 460, 447, 448, 449, 454, 455, 248/457, 462, 463, 464, 472, 474, 495, 248/150, 155.4, 166
See application file for complete search history.

(56) References Cited

U.S. PATENT DOCUMENTS

| | | | |
|---|---|---|---|
| 8,229,295 | B2 | 7/2012 | Wu |
| 8,757,461 | B2 | 6/2014 | Zanetti |

(Continued)

FOREIGN PATENT DOCUMENTS

| | | |
|---|---|---|
| WO | WO 2012/166114 | 12/2012 |

*Primary Examiner* — Alfred J Wujciak
(74) *Attorney, Agent, or Firm* — BAKERHOSTETLER

(57) ABSTRACT

An accessory device is designed to hold, by magnetic coupling, an electronic device and adjust one or more arms to support the electronic device on various objects. In one or more implementations, an accessory device includes one or more arms, each of which being capable of relative movement with each other. The arms of the accessory device can be moved to conform to the size, shape, and perimeter of various objects, thus allowing the accessory device to mount the electronic device on various objects. Moreover, once mounted on the object, the accessory device can further orient the electronic device such that either the camera(s) on the back of the electronic device faces a user (of the electronic device) or the display of the electronic device faces the user.

15 Claims, 12 Drawing Sheets

(51) Int. Cl.
    *H04M 1/02*           (2006.01)
    *H04M 1/21*           (2006.01)

(56)            References Cited

U.S. PATENT DOCUMENTS

| | | | |
|---|---|---|---|
| 10,564,671 B1 | 2/2020 | Romo | |
| 2004/0253132 A1 | 12/2004 | Cho | |
| 2007/0001071 A1 | 1/2007 | Yeh | |
| 2008/0101787 A1* | 5/2008 | Kuo | H04N 1/00241 |
| | | | 396/310 |
| 2011/0243547 A1 | 10/2011 | Khamsepoor | |
| 2013/0048817 A1 | 2/2013 | Wang | |
| 2013/0284879 A1* | 10/2013 | Low | G03B 17/561 |
| | | | 248/558 |
| 2015/0011265 A1 | 1/2015 | Walsh | |
| 2015/0044938 A1 | 2/2015 | Chieffo | |
| 2015/0185771 A1 | 7/2015 | Clark | |
| 2016/0116105 A1* | 4/2016 | Huang | F16M 13/00 |
| | | | 248/462 |
| 2016/0277552 A1 | 9/2016 | Scully | |
| 2017/0023752 A1 | 1/2017 | Isenhour | |
| 2017/0201194 A1 | 7/2017 | Hahn | |
| 2017/0264725 A1 | 9/2017 | Holder | |
| 2018/0008044 A1 | 1/2018 | Holt | |
| 2019/0064878 A1 | 2/2019 | Corbin | |
| 2019/0139396 A1 | 5/2019 | Cruver | |
| 2019/0349459 A1 | 11/2019 | Cha | |
| 2020/0062191 A1 | 2/2020 | Ragner | |
| 2020/0163240 A1 | 5/2020 | Lee | |
| 2020/0412853 A1 | 12/2020 | Zhu | |
| 2021/0057937 A1 | 2/2021 | Adra | |
| 2021/0195398 A1 | 6/2021 | Baldree | |
| 2022/0228707 A1 | 7/2022 | Ng | |
| 2023/0134656 A1 | 5/2023 | Smolka | |
| 2023/0136884 A1* | 5/2023 | Li | G06F 1/1607 |
| | | | 248/316.7 |
| 2024/0308436 A1* | 9/2024 | Yao | F16M 11/041 |
| 2025/0137581 A1* | 5/2025 | Fan | F16M 13/022 |
| 2025/0151210 A1* | 5/2025 | Merenda | H05K 5/0086 |

* cited by examiner

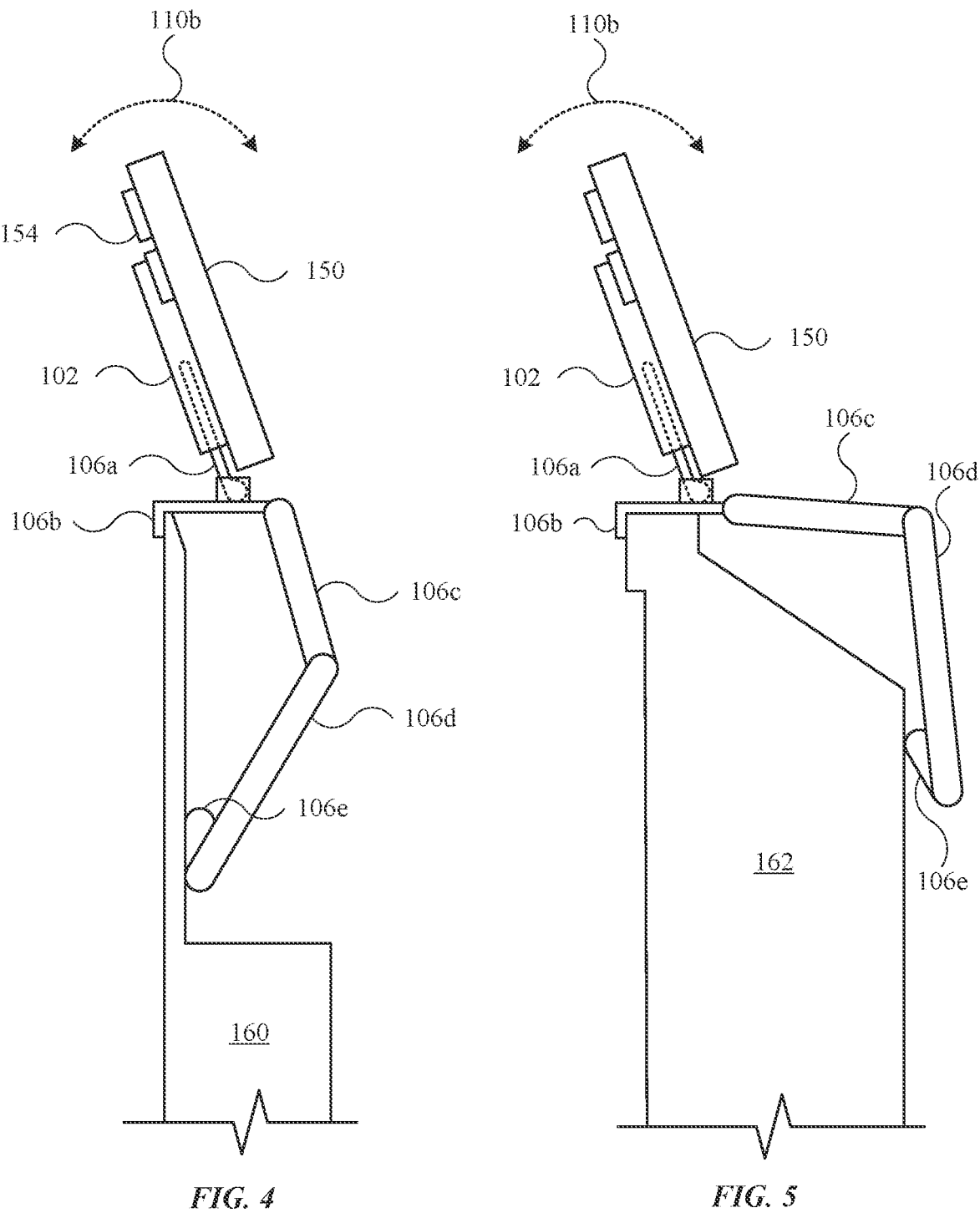
*FIG. 4*               *FIG. 5*

ACCESSORY DEVICES FOR SECURING ELECTRONIC DEVICES TO VARIOUS STRUCTURES

CROSS REFERENCED TO RELATED APPLICATION

This application claims the benefit of U.S. Provisional Application No. 63/470,747, entitled "ACCESSORY DEVICES FOR SECURING ELECTRONIC DEVICES TO VARIOUS STRUCTURES," filed Jun. 2, 2023, the entirety of which is incorporated herein by reference.

TECHNICAL FIELD

This application is directed to accessory devices, and more particularly, to accessory devices that magnetically couple with and support electronic devices, thereby allowing the electronic devices to be mounted to various objects.

BACKGROUND

Accessory devices may be used as an attachment to electronic devices. Accessory devices may be used to secure electronic devices to other devices.

BRIEF DESCRIPTION OF THE DRAWINGS

Certain features of the subject technology are set forth in the appended claims. However, for purpose of explanation, several embodiments of the subject technology are set forth in the following figures.

FIG. 4 and FIG. 5 illustrate side views of an example accessory device coupled to an object and holding an electronic device, in accordance with aspects of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to accessory devices for carrying electronic devices such as mobile wireless communication devices (e.g., smartphones, tablet computing devices). Accessory devices described herein may include a device holder with a magnetic assembly that includes one or more magnets for magnetically coupling to an electronic device. Further, the magnetic assembly may permit the electronic device to rotate, thereby allowing for different orientations of the electronic device. Additionally, accessory devices described herein may include several arms that are movable (e.g., rotatable) with respect to each other. In this regard, the arms can be rotated and moved together to provide a base, or compact stand, for holding an electronic device. Alternatively, the arms can be rotated and moved apart to secure to an object (e.g., display, television, etc.). Beneficially, the arms can be rotated relative to each other to conform to a shape or perimeter of a variety of objects, including objects that vary in size and shape.

These and other embodiments are discussed below with reference to FIGS. 1-17. However, those skilled in the art will readily appreciate that the detailed description given herein with respect to these Figures is for explanatory purposes only and should not be construed as limiting.

Figure 1:
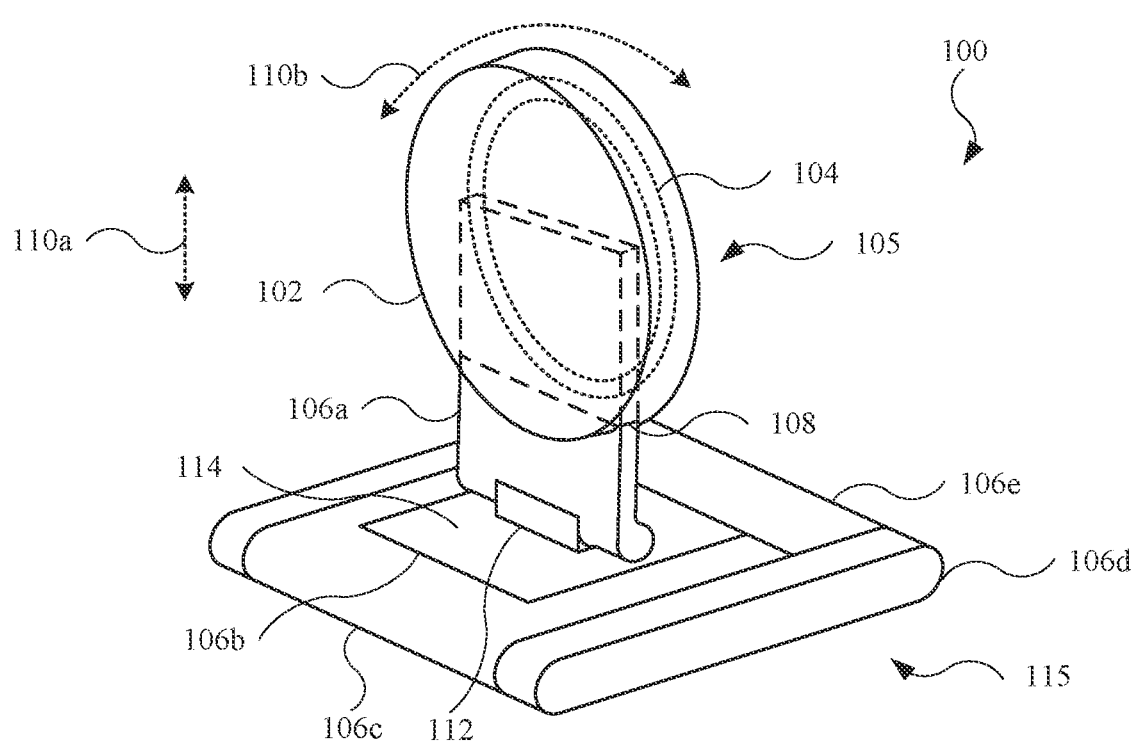
FIG. 1 illustrates a perspective view of an example accessory device, in accordance with aspects of the present disclosure.

According to in one or more implementations, for example as shown in FIG. 1, an accessory device 100 is suitable for use with electronic devices, such as mobile wireless communication devices (e.g., smartphones, tablet computing devices). In one or more implementations, accessory device 100 can hold or carry an electronic device (not shown in FIG. 1). Moreover, accessory device 100 may be oriented in various manners, thus allowing accessory device 100 to be mounted to various objects (e.g., laptop computing devices, displays, stationary objects, etc.) while holding an electronic device in a desired orientation.

Accessory device 100 may include a device holder 102. In one or more implementations, device holder 102 takes the form of a disc. Accessory device 100 may further include a magnetic assembly 104 located in device holder 102. Magnetic assembly 104 may include one or more magnets arranged, in a circular or disc-like manner, to magnetically couple with an electronic device, and in particular, with a corresponding magnetic assembly of an electronic device.

Accessory device 100 may further include a surface 105 designed to contact an electronic device while magnetic assembly 104 magnetically couples with a corresponding magnetic assembly of the electronic device.

Accessory device 100 may further include an arm 106*a*. As shown, arm 106*a* is located, or at least partially located, in device holder 102. In this regard, device holder 102 may include an opening 108 through which arm 106*a* may pass. In one or more implementations, device holder 102 is movable with respect to arm 106*a*. For example, device holder 102 can move in either direction of a two-way arrow 110*a*. Beneficially, device holder 102 may position an electronic device in multiple positions based in part on arm 106*a*.

Accessory device 100 may further include an arm 106*b*. Accessory device 100 may further include a feature used to couple with arms 106*a* and 106*b* together. For example, accessory device 100 may include a clip 112 located on a surface 114 of arm 106*b*. Clip 112 may allow relative movement between arms 106*a* and 106*b*. For example, clip 112 may allow movement (e.g., rotation) of arm 106*a* relative to arm 106*b*. Thus, arms 106*a* and 106*b* may be rotationally coupled to each other by clip 112. Further, clip 112 may allow movement of arm 106*a* relative to arm 106*b* in either direction of a two-way arrow 110*b*. Two-way arrow 110*b* may represent movement of arm 106*a* to 180 degrees, or at least approximately to 180 degrees. Accessory device 100 may further include one or more additional arms, which will be shown and described below. As shown in FIG. 1, the one or more additional arms are folded together to form a base 115 for accessory device 100. For example, accessory device 100 may further include an arm 106*c*, an arm 106*d*, and an arm 106*e*, with arms 106*c*, 106*d*, and 106*e* folded together to form base 115.

Figure 2:
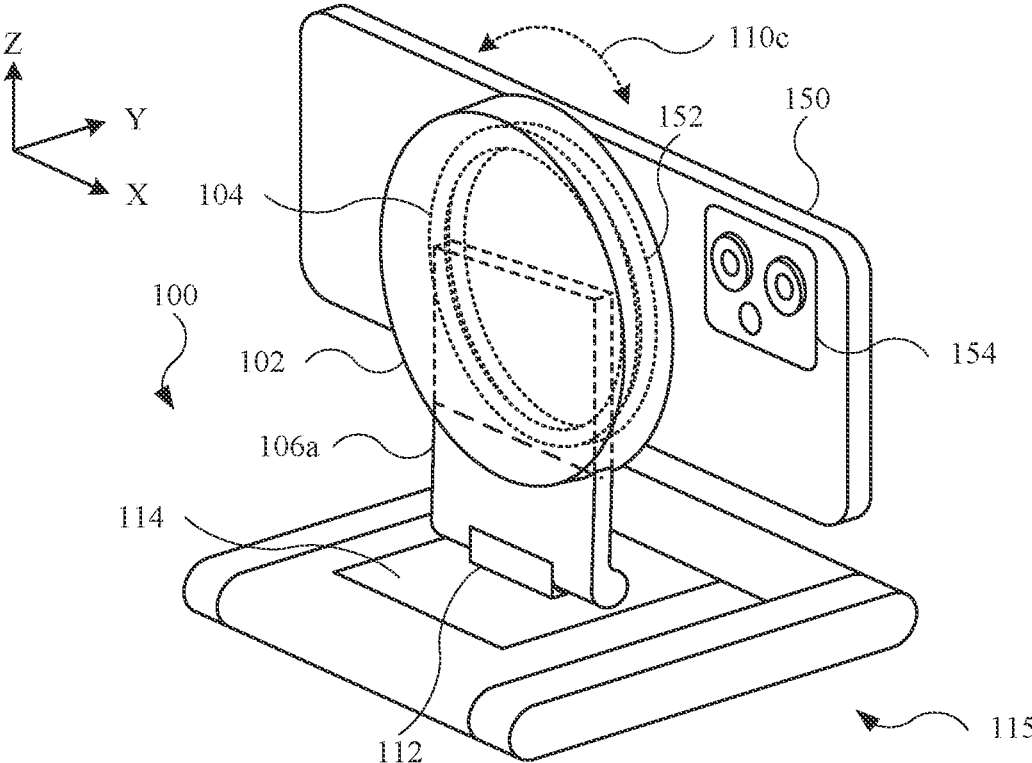
FIG. 2 illustrates a perspective view of an example accessory device holding an electronic device, in accordance with aspects of the present disclosure.

Referring to FIG. 2, accessory device 100 is holding or carrying an electronic device 150. As shown, magnetic assembly 104 located in device holder 102 is magnetically coupled with a magnetic assembly 152 (e.g., a corresponding magnetic assembly) of electronic device 150. Device holder 102, having a disc shape, may avoid covering or obscuring a camera assembly 154 of electronic device 150, including when camera assembly 154 includes multiple cameras as shown in FIG. 2. Further, based on the magnetic coupling between magnetic assembly 104 and magnetic assembly 152, magnetic assembly 104 of accessory device 100 may permit movement (e.g., rotational movement) of electronic device 150 in either direction of a two-way arrow 110*c*, thus allowing additional rotation of electronic device 150 including 360 degrees of rotation. Accordingly, device holder 102 may move vertically (e.g., along a Z-axis of Cartesian coordinates, or in an upward direction of the two-way arrows 110*a* in FIG. 1), while magnetic assembly 104 allows electronic device 150 to rotate. Moreover, base 115 may provide a stable platform to hold and balance electronic device 150 at various angles. Accordingly, accessory device 100 (representative of additional accessory devices shown and/or described herein) may be used to hold electronic device 150 while orienting camera assembly 154 toward a user, thus allowing the user to be recorded by camera assembly 154 in a hands-free manner. Alternatively, accessory device 100 can be turned to orient a display (not shown in FIG. 2) of electronic device 150 toward user, thus allowing the user to view the display in a hands-free manner.

Additionally, clip 112 may be centrally located (e.g., located at a center) of surface 114. In this regard, accessory device 100 may provide a standalone accessory device (e.g., not coupled to an object) using base 115, while balancing electronic device 150. This may include any movement, along two-way arrows 110*a* and 110*b* (both shown in FIG. 1) and along two-way arrow 110*c*, of the aforementioned components of accessory device 100 while still holding electronic device 150 and without falling or tipping over.

Figure 3:
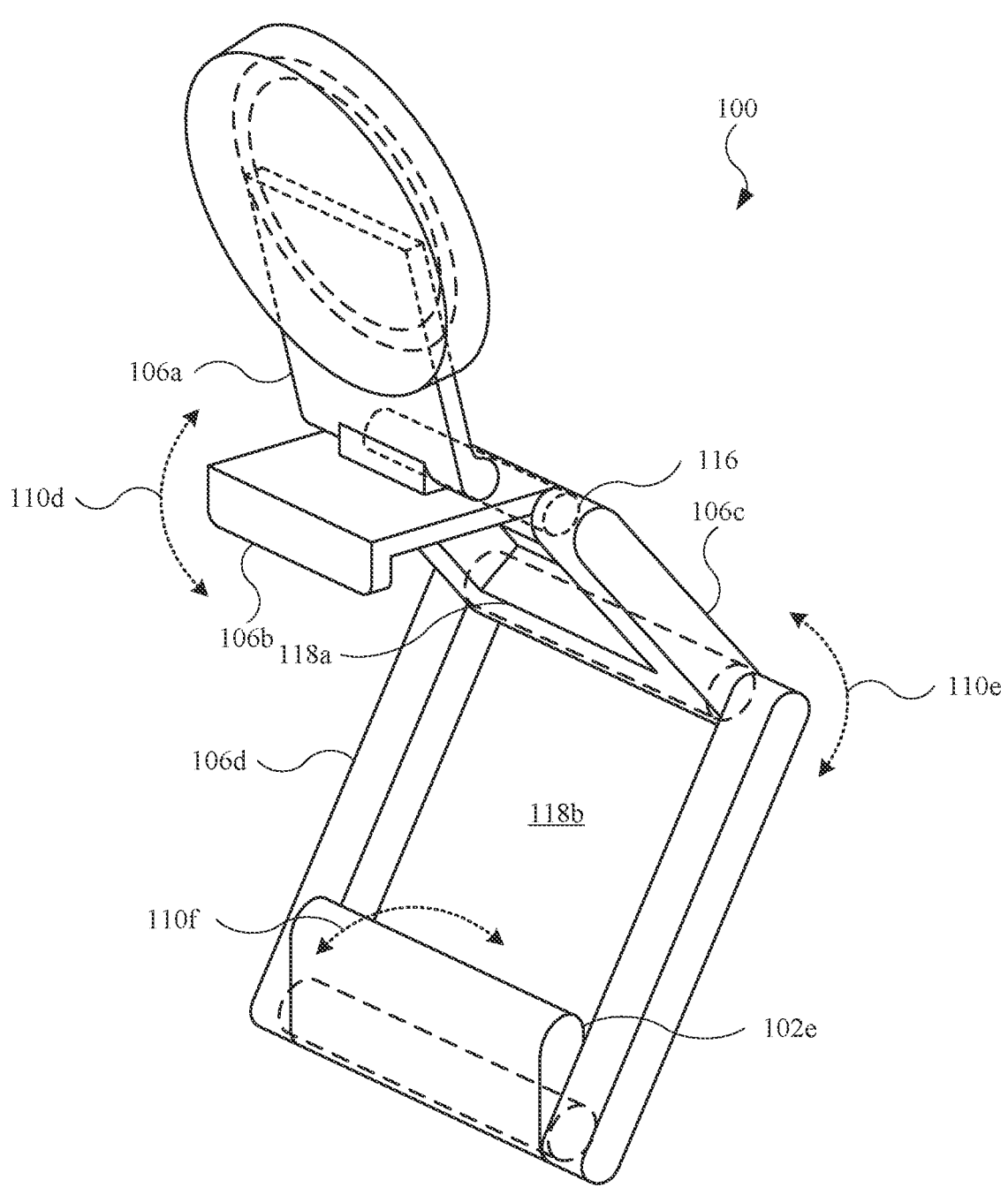
FIG. 3 illustrates a perspective view of an example accessory device in an alternate orientation, in accordance with aspects of the present disclosure.

Referring to FIG. 3, the arms of accessory device 100 may rotate away from each other. For example, in addition to arms 106*a* and 106*b* moving relative to each other, arm 106*c* may be coupled (e.g., rotationally coupled) to arm 106*b*, thus allowing rotational movement between arms 106*b* and 106*c*. For example, arm 106*b* may rotate, relative to arm 106*c*, in either direction of a two-way arrow 110*d*. Additionally, arms 106*c* and 106*d* may rotate relative to each other. For example, arm 106*c* may rotate, relative to arm 106*d*, in either direction of a two-way arrow 110*e*. In one or more implementations, each of two-way arrows 110*d* and 110*e* represents at least 90 degrees of rotation, which may include rotation of 180 degrees or more. Conversely, arm 106*d* may rotate relative to arm 106*c* in either direction of two-way arrow 110*e*. Further, arms 106*d* and 106*e* may rotate relative to each other. For example, arm 106*e* may rotate, relative to arm 106*d*, in either direction of a two-way arrow 110*f*. Generally, each of the arms 106*a*, 106*b*, 106*c*, 106*d*, and 106*e* are movable (e.g., rotatable) relative to the remaining arms. In this regard, the arms may be connected to each other by respective hinges. For example, arms 106*b* and 106*c* are connected together by a hinge 116, representative of additional hinges (shown, not labeled). Beneficially, accessory device 100 can take on various positions and conform to a perimeter of different objects. This will be shown and described below in further detail.

Additionally, some arms may include internal volumes, representing a space for other arms. For example, arm 106*c* may include an internal volume 118*a* that provides a space into which arm 106*b* can rotate. Additionally, arm 106*d* may include an internal volume 118*b* provides a space into which arms 106*c* and 106*e* can rotate. By providing internal volumes 118*a* and 118*b* in arms 106*c* and 106*d*, respectively, arms 106*c*, 106*d*, and 106*e* can fold together to form base 115 (shown in FIGS. 1 and 2).

Referring to FIG. 4, accessory device 100 is secured with an object 160. In one or more implementations, object 160 is a display screen such as a flat screen display, a laptop display, or an organic light emitting diode (LED) display, as non-limiting examples. Generally, object 160 may include any flat, or relatively flat, object. When object 160 takes the form of a display, accessory device 100 may orient camera assembly 154 toward a user, thus allowing the user to record herself while also viewing herself through object 160. Thus, accessory device 100 may be used in applications such as video conferencing or podcasts, as non-limiting examples. As shown, several arms of accessory device 100 can conform to object 160, thus allowing accessory device 100 to secure with object 160 and mount electronic device 150 to object 160. For example, arm 106*b* may be used as a hook to engage or grasp to object 160 at one location of object 160 (e.g., a border or frame of a display), as well as rest on object 160. Further, arms 106*c* and 106*d* can be rotated to maintain arm 106*b* in a horizontal, or substantially horizontal, manner. Still further, arm 106*e* can rotate relative to arm 106*d* to engage object 160 at another location of object 160 (e.g., a back surface of a display). In this regard, accessory device 100 can support electronic device 150 in a stable manner (e.g., balance electronic device 150). Moreover, device holder 102 can move in either of two directions defined by arm 106*a* (e.g., toward or away from arm 106*b*), while arm 106*a* and device holder 102 can rotate in either direction of two-way arrow 110*b*.

Referring to FIG. 5, accessory device 100 is secured with an object 162. In one or more implementations, object 162 is a traditional display screen or a non-electronic device, as non-limiting examples. Generally, object 162 may include any thick, or relatively thick, object. Nonetheless, several arms of accessory device 100 can conform to object 162, thus allowing accessory device 100 to secure with object 162 and mount electronic device 150 to object 162. For example, arm 106*b* may be used as a hook to engage or grasp to object 162 at one location of object 162. Further, arms 106*c* and 106*d* can be rotated in a different manner (e.g., different than what is shown in FIG. 4) to maintain arm 106*b* in a horizontal, or substantially horizontal, manner. Still further, arm 106*e* can rotate relative to arm 106*d* to engage object 162 at another location of object 162. Despite object 162 having different dimensions than those of object 160 (shown in FIG. 4), accessory device 100 can still support electronic device 150 in a stable manner, with device holder 102 being capable of moving in either of two directions defined by arm 106*a*, and arm 106*a* and device holder 102 being capable of rotating in either direction of two-way arrow 110*b*.

Figure 6:
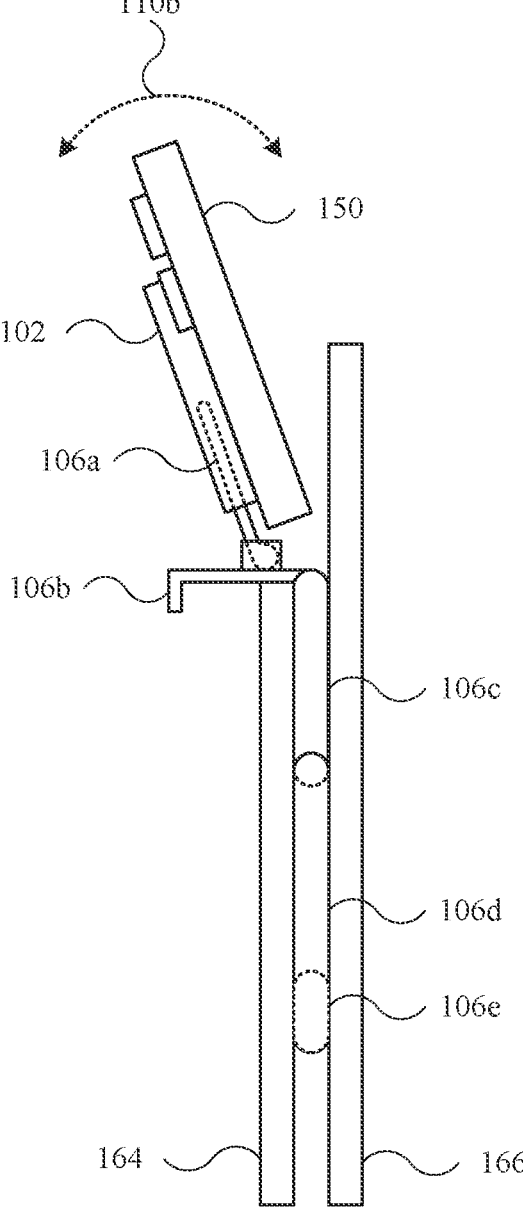
FIG. 6 illustrates a side view of an example accessory device oriented to fit between two structures while holding an electronic device, in accordance with aspects of the present disclosure.

Referring to FIG. 6, accessory device 100 is secured between an object 164 and an object 166. In one or more implementations, objects 164 and 166 represent a pair of books. In one or more implementations, object 166 is a wall and object 164 is a structure (e.g., painting) mounted to object 166. Generally, objects 164 and 166 may include any pair of nearby structures with a space there between. Nonetheless, several arms of accessory device 100 can conform to the space between objects 164 and 166, thus allowing accessory device 100 to secure between objects 164 and 166, and mount electronic device 150. For example, arm 106*b* may rest on object 164. Further, arms 106*c*, 106*d*, and 106*e* can be rotated to form a vertical, or substantially vertical, array of arms to fit between objects 164 and 166, while maintaining arm 106*b* in a horizontal, or substantially horizontal, manner. Accessory device 100 can still support electronic device 150 in a stable manner, with device holder 102 being capable of moving in either of two directions defined by arm 106*a*, and arm 106*a* and device holder 102 being capable of rotating in either direction of two-way arrow 110*b*.

Figure 7:
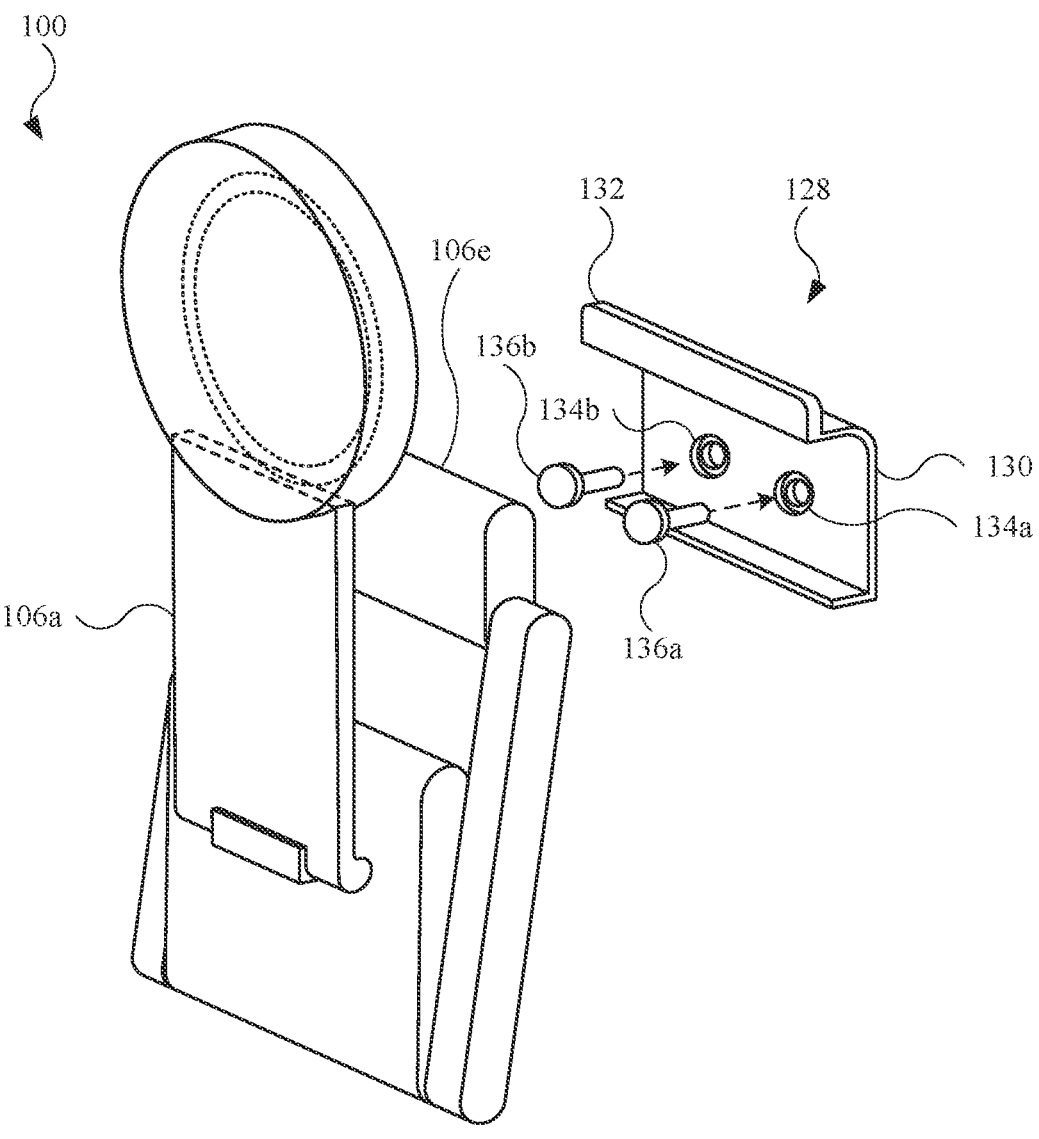
FIG. 7 illustrates a perspective view of an example accessory device capable of coupling with an external clip, in accordance with aspects of the present disclosure.

Referring to FIG. 7, accessory device 100 may include, or be capable of coupling to, a clip 128. For example, clip 128 may represent an external clip that includes a receptacle 130 designed to receive arm 106*e* of accessory device 100. To release from receptacle 130, clip 128 may include a tab 132. By providing a force (e.g., pulling force) to tab 132, arm 106*e* may be removed from receptacle 130, thus decoupling accessory device 100 from clip 128.

Also, clip 128 may include multiple openings. For example, clip 128 may include an opening 134*a* and an opening 134*b*. As shown, opening 134*a* and opening 134*b* may receive a fastener 136*a* and a fastener 136*b*, respectively, thus allowing clip 128 to secure to an object (not shown in FIG. 7). In this regard, accessory device 100 may be mounted to an object using clip 128.

Figure 8:
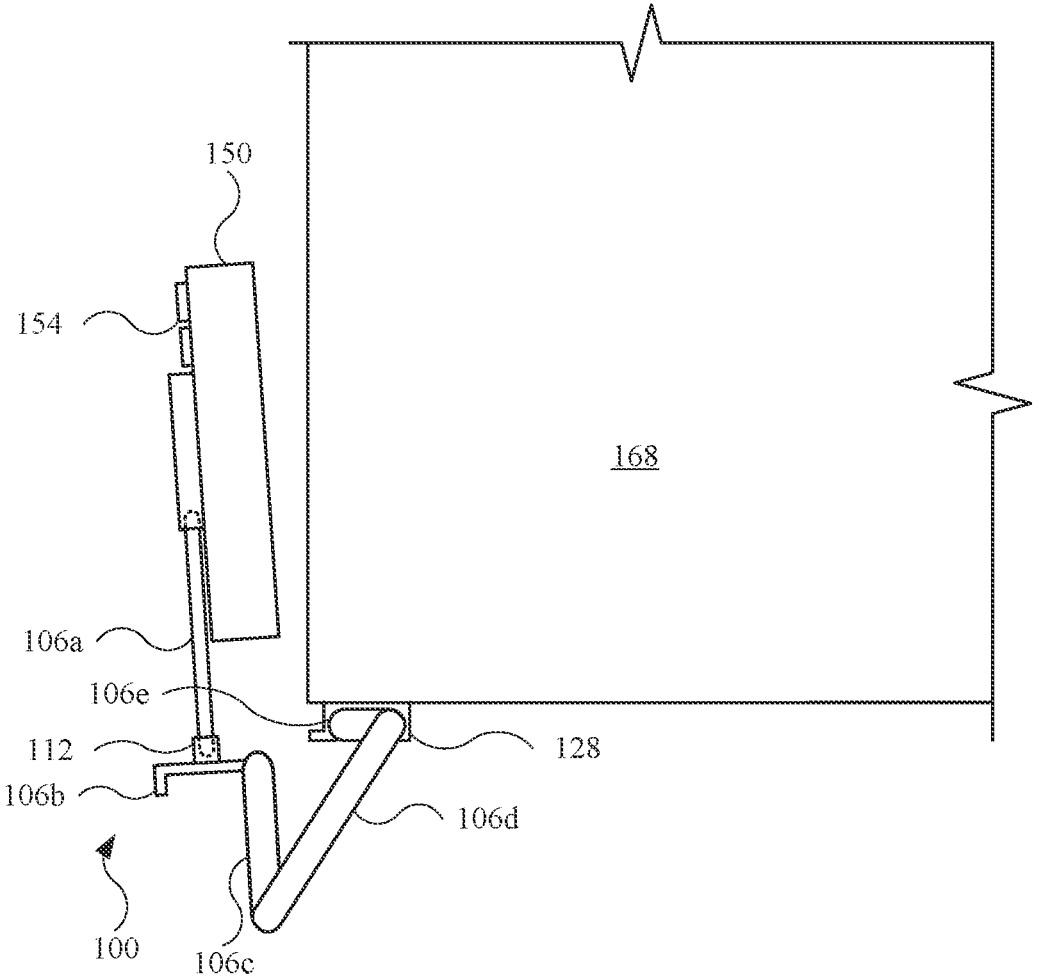
FIG. 8 and FIG. 9 illustrate side views of an example accessory device mounted to an object using an external clip and holding an electronic device in different orientations, in accordance with aspects of the present disclosure.

Referring to FIG. 8, clip 128 is secured to an object 168. In one or more implementations, object 168 includes a cupboard or other wall-mounted object. As shown, clip 128 may be secured with a lower surface, or bottom surface, of object 168. Accessory device 100 may support electronic device 150 such that camera assembly 154 of electronic device 150 faces a user, thus allowing the user to be recorded by camera assembly 154. In this regard, arms 106*c* and 106*d* may be rotated to orient electronic device 150 in the manner shown in FIG. 8. When accessory device 100 is mounted to object 168 in a particular room (e.g., kitchen), accessory device 100 may orient electronic device 150 to record a user performing a particular function (e.g., cooking show) in the room while not having to physically handle electronic device 150.

Figure 9:
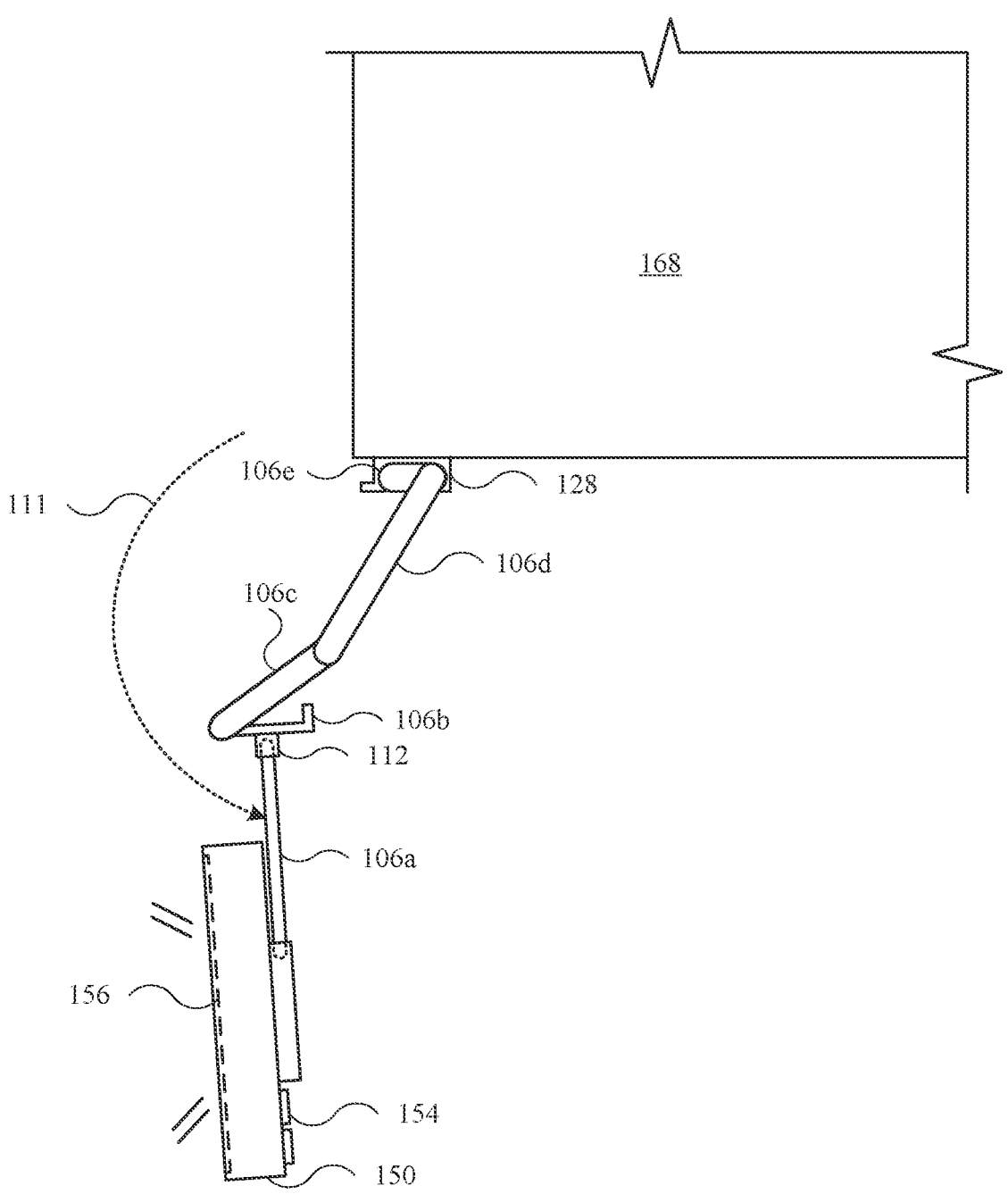

Referring to FIG. 9, accessory device 100 is rotated by an angle 111 (e.g., 180 degrees, or approximately 180 degrees) to orient a display 156 of electronic device 150 toward a user, thus allowing the user to view display 156. While arm 106*e* remains in clip 128, arms 106*c* and 106*d* may be rotated to position accessory device 100 and electronic device 150 in the manner shown in FIG. 9. When accessory device 100 is mounted to object 168 in a particular room (e.g., in a house), accessory device 100 may orient electronic device 150 in a manner that allow the user to view multimedia content on display 156.

FIGS. 8 and 9 depict accessory device 100 being oriented in two different manners to orient a particular feature (e.g., camera assembly 154 or display 156) toward a user. Moreover, while several arms of accessory device 100 represent movable, or rotatable arms, the arms may nonetheless be in frictional engagement with other arms, thus providing a frictional force that allows the arms of accessory device 100 to remain in a fixed position until acted upon. For example, arms 106*c* and 106*d* may hold their respective positions based on friction engagement with each other. Additionally, a frictional engagement between arms 106*b* and 106*c*, as well as a frictional engagement between 106*d* and 106*e*, may hold accessory device 100 in the desired positions shown in FIGS. 8 and 9. Also, clip 112 may provide a frictional force to arm 106*a* to maintain arm 106*a* in a fixed position until acted upon.

FIGS. 10-17 show and describe alternate examples of accessory devices. The accessory devices shown and described in FIGS. 10-17 may include at least some features (e.g., device holder, magnetic assembly) shown and described for accessory device 100 in FIGS. 1-9. Further, although not expressly shown for each exemplary accessory device in FIGS. 10-17, the accessory devices in FIGS. 10-17 may carry an electronic device in a manner similar to accessory device 100, as shown in FIG. 2, FIGS. 4-6, FIG. 8, and FIG. 9.

Figure 10:
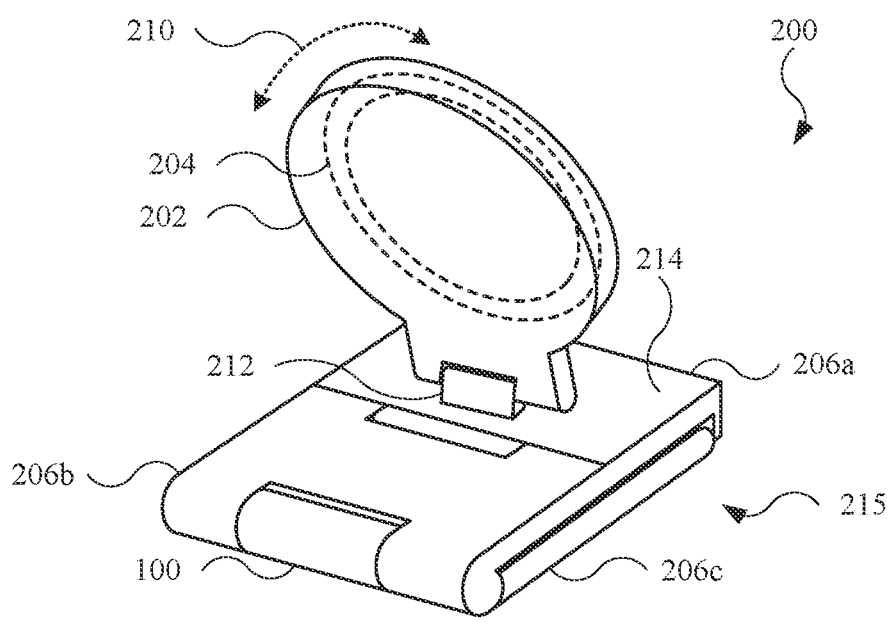
FIG. 10 and FIG. 11 illustrate perspective views of an example of an alternate accessory device with a different number of arms, in accordance with aspects of the present disclosure.

Referring to FIG. 10, an accessory device 200 includes a device holder 202 with a magnetic assembly 204. Device holder 202 may be used to hold an electronic device (not shown in FIG. 10) when a corresponding magnetic assembly is magnetically coupled to magnetic assembly 204 located in device holder 202. Accessory device 200 may further include an arm 206*a*. Device holder 202 may couple to a clip 212 that is located on a surface 214 of arm 206*a*. Clip 212 may allow device holder 202 to move (e.g., rotate), relative to arm 206*a*, in either direction of a two-way arrow 210, representing movement of device holder 202 to 180 degrees, or at least approximately to 180 degrees. Accessory device 200 may further include an arm 206*b* coupled (e.g. rotationally coupled) to arm 206*a*. Additionally, accessory device 200 may further include an arm 206*c* coupled (e.g. rotationally coupled) to arm 206*b*. As shown, arms 206*a*, 206*b*, and 206*c* are folded together to form a base 215, which may provide a stable platform to hold and balance an electronic device at various angles.

Figure 11:
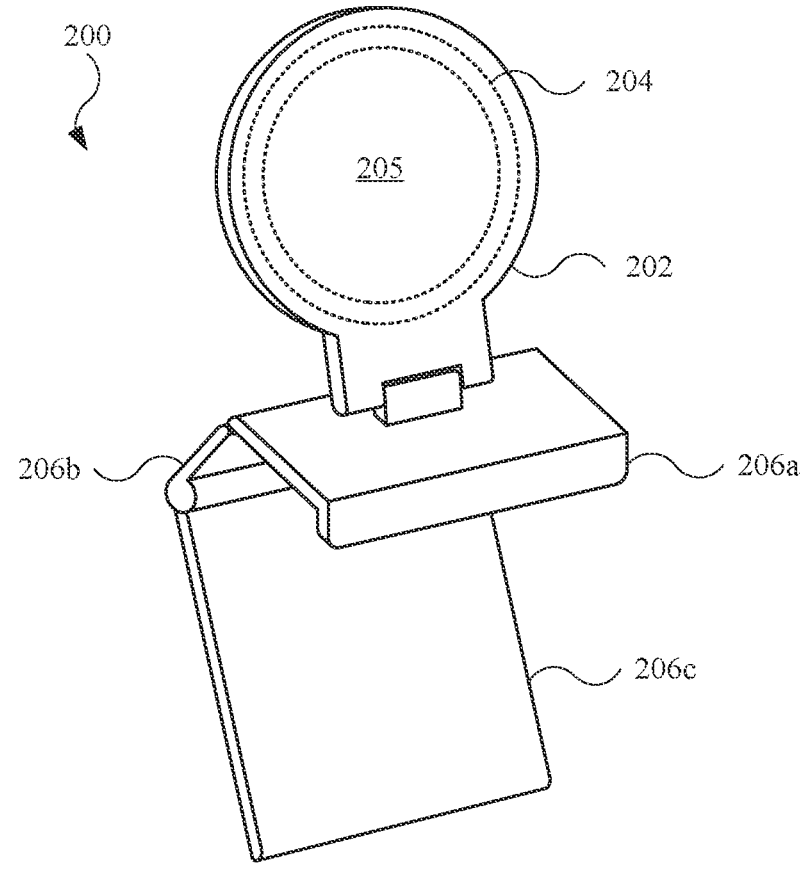

Referring to FIG. 11, arms 206*a*, 206*b*, and 206*c* of accessory device 200 are folded away from each other, thus allowing accessory device 200 to engage an object (e.g., objects 160 and 162, shown in FIGS. 4 and 5, respectively). Similar to prior embodiments, arms 206a, 206b, and 206c of accessory device 200 are rotatable, including rotatable relative to each other, to engage objects of various sizes and shapes. However, accessory device 200 represents an accessory with fewer arms (e.g., three arms) than prior accessory devices (e.g., with five arms), which may simplify manufacturing and production costs. Also, accessory device 200 may further include a surface 205 designed to contact an electronic device (not shown in FIG. 11) while magnetic assembly 204 magnetically couples with a corresponding magnetic assembly of the electronic device.

Figure 12:
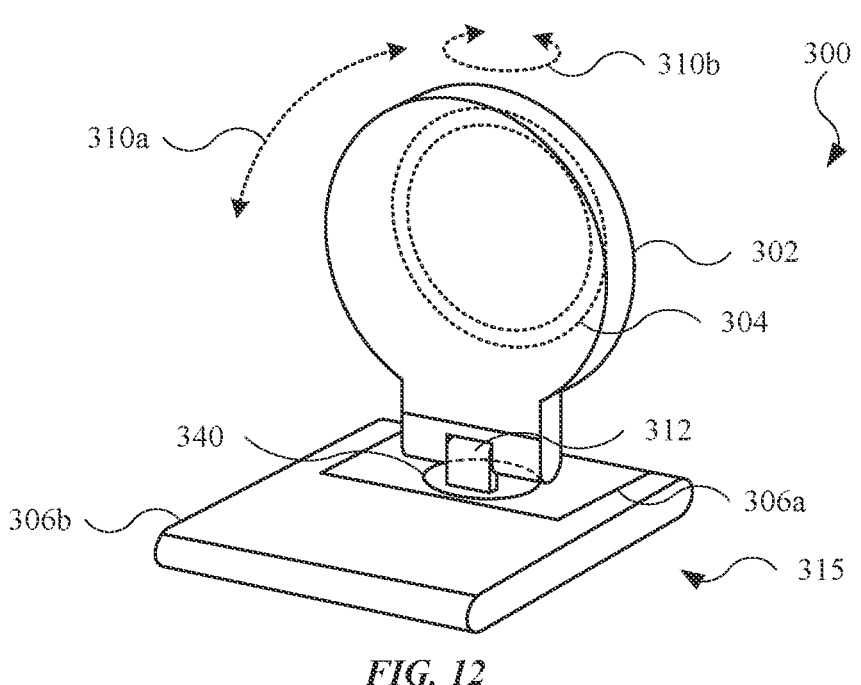
FIG. 12 and FIG. 13 illustrate perspective views of an example of an alternate accessory device that includes an arm designed to swivel, in accordance with aspects of the present disclosure.

Referring to FIG. 12, an accessory device 300 includes a device holder 302 with a magnetic assembly 304. Device holder 302 may be used to hold an electronic device (not shown in FIG. 12) when a corresponding magnetic assembly is magnetically coupled to magnetic assembly 304 located in device holder 302. Accessory device 300 may further include an arm 306a, with device holder 302 coupled to a clip 312, which may allow device holder 302 to rotate, relative to arm 306a, in either direction of a two-way arrow 310a. Two-way arrow 310a may represent movement of arm 106a to 180 degrees, or at least approximately to 180 degrees. Further, accessory device 300 may include a platform 340 positioned within, or at least partially within, arm 306a. Platform 340 may allow device holder 302 to rotate, relative to arm 306a, in either direction of a two-way arrow 310b. Two-way arrow 310b may represent 360 degrees of movement of arm 306a, or at least approximately 360 degrees of movement.

Accessory device 300 may further include an arm 306b coupled (e.g. rotationally coupled) to arm 306a. As shown, arms 306a and 306b are folded together to form a base 315, which may provide a stable platform to hold and balance an electronic device at various angles.

Figure 13:
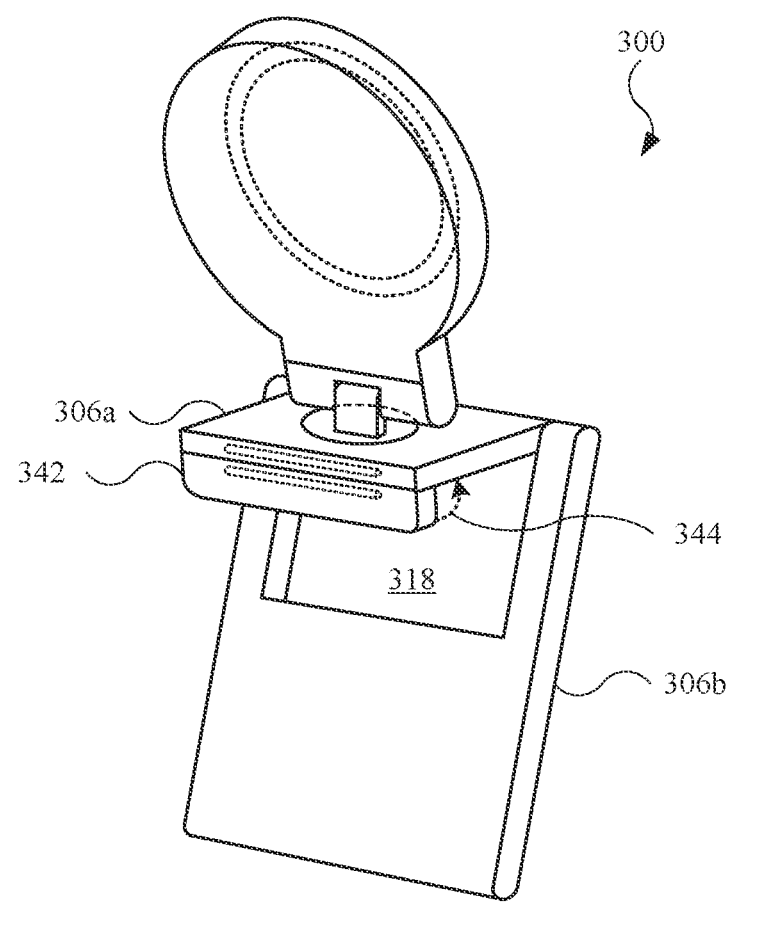

Referring to FIG. 13, arms 306a and 306b of accessory device 300 are folded away from each other, thus allowing accessory device 300 to engage an object (e.g., objects 160 and 162, shown in FIGS. 4 and 5, respectively). Similar to prior embodiments, arms 306a and 306b of accessory device 300 are rotatable, including rotatable relative to each other, to engage objects of various sizes and shapes. However, accessory device 300 represents an accessory with fewer arms (e.g., two arms) than prior accessory devices (e.g., three arms, five arms), which may simplify manufacturing and production costs.

Additionally, arm 306b may include an internal volume 318 that provides a space for arm 306a (e.g., as shown in FIG. 12). Also, arm 306a may include a hook 342. While prior examples of accessory devices include a hook, or hook-like structure, hook 342 may represent a foldable hook. For example, hook 342 may fold by an angle 344. Angle 344 may be a 90-degree angle, or approximately 90-degree angle. It should be noted that angle 344 may include generally an angle at or between 0 and 90 degrees. Beneficially, hook 342 may provide accessory device 300 with even greater flexibility to engage an object (not shown in FIG. 13) at another location of the object.

Figure 14:
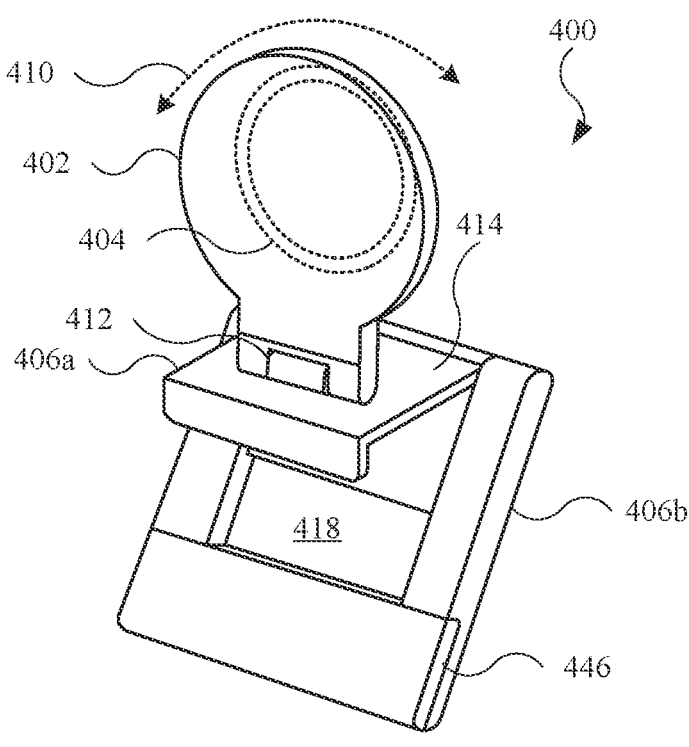
FIG. 14 and FIG. 15 illustrate perspective views of an example of an alternate accessory device that includes an arm with an extension used to adjust the accessory device to multiple objects, in accordance with aspects of the present disclosure.

Referring to FIG. 14, an accessory device 400 includes a device holder 402 with a magnetic assembly 404. Device holder 402 may be used to hold an electronic device (not shown in FIG. 14) when a corresponding magnetic assembly is magnetically coupled to magnetic assembly 404 located in device holder 402. Accessory device 400 may further include an arm 406a. Device holder 402 may couple to a clip 412 that is located on a surface 414 of arm 406a. Clip 412 may allow device holder 402 to move (e.g., rotate), relative to arm 406a, in either direction of a two-way arrow 410, representing movement of device holder 402 to 180 degrees, or at least approximately to 180 degrees.

Accessory device 400 may further include an arm 406b coupled (e.g. rotationally coupled) to arm 406a. Arm 406b may include an internal volume 418 that provides a space into which arm 406a may fold. Arm 406b may further include an extension 446 that is coupled (e.g., rotationally coupled) to arm 406b. In one or more implementations, extension 446 is rotatable to engage an object.

Figure 15:
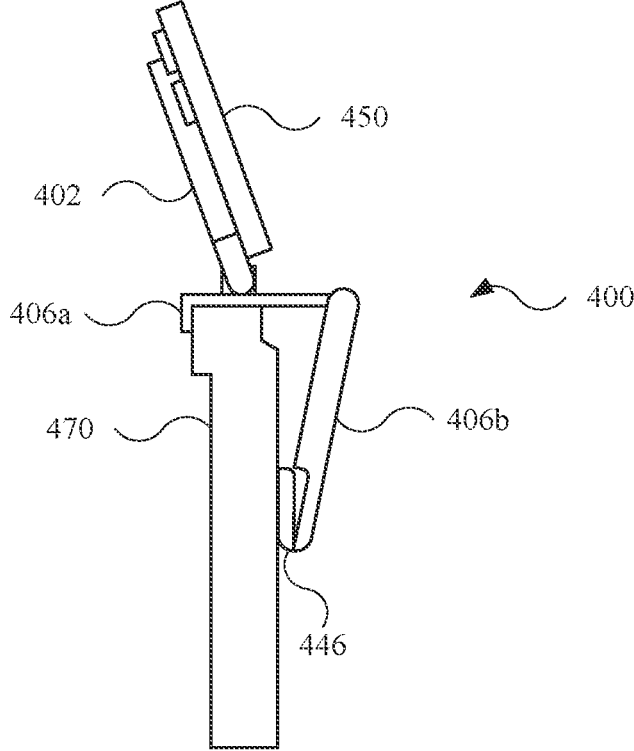

Referring to FIG. 15, arms 406a and 406b of accessory device 400 are folded away from each other, thus allowing accessory device 400 to engage an object 470. Further, device holder 402 is coupled (e.g., magnetically coupled to) a magnetic assembly (not shown in FIG. 15) of an electronic device 450 to hold and carry electronic device 450. As shown, arm 406a is engaged with object 470 at one location of object 470. Further, extension 446 is rotated away from arm 406b to engage object 470 at another location of object 470. By integrating extension 446 with arm 406b, accessory device 400 may include fewer parts (e.g., fewer arms) and relatively simpler manufacturing and assembly.

Figure 16:
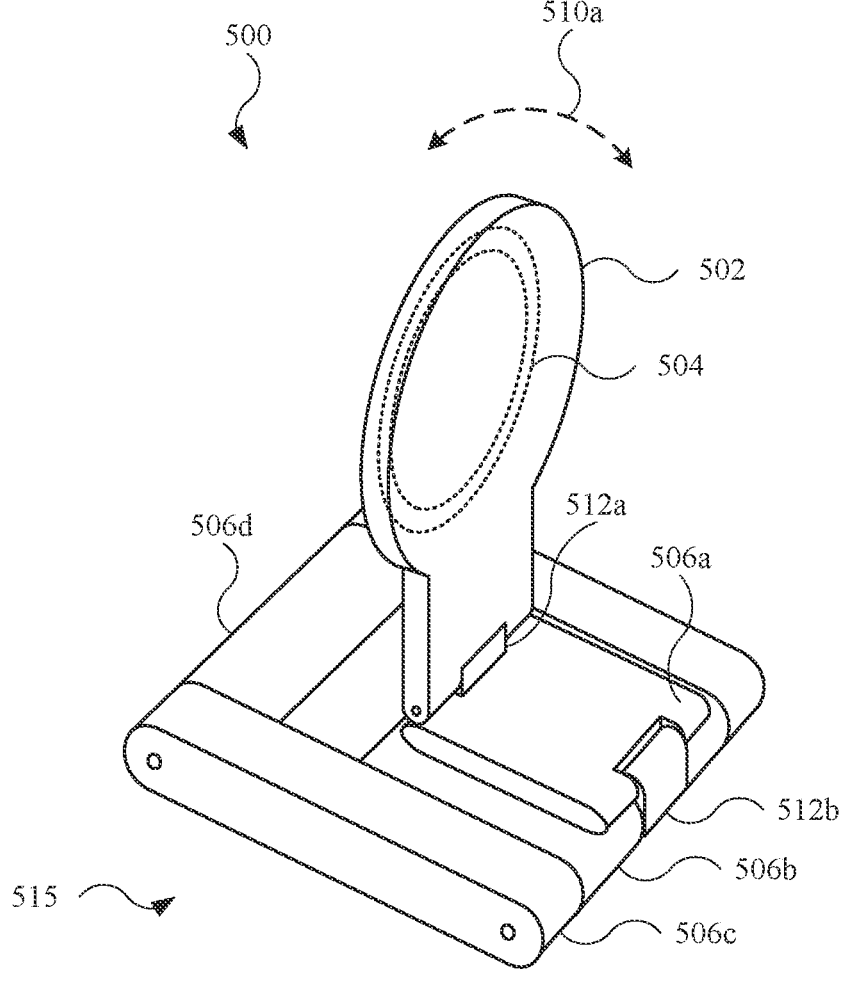
FIG. 16 and FIG. 17 illustrate perspective views of an example of an alternate accessory device that includes multiple arms that can be adjusted to adjust a position of an electronic device, in accordance with aspects of the present disclosure.

Referring to FIG. 16, an accessory device 500 includes a device holder 502 with a magnetic assembly 504. Device holder 502 may be used to hold an electronic device (not shown in FIG. 16) when a corresponding magnetic assembly is magnetically coupled to magnetic assembly 504 located in device holder 502. Accessory device 500 may further include an arm 506a, with device holder 502 coupled to arm 506a by a clip 512a. Clip 512a may allow device holder 502 to rotate, relative to arm 506a, in either direction of a two-way arrow 510a, representing movement of device holder 502 to 180 degrees, or at least approximately to 180 degrees. Accessory device 500 may further include an arm 506b coupled (e.g. rotationally coupled) to arm 506a based on a clip 512b. Additionally, accessory device 500 may further include an arm 506c coupled (e.g. rotationally coupled) to arm 506b, as well as an arm 506d coupled (e.g. rotationally coupled) to arm 506c. As shown, arms 506a, 506b, 506c, and 506d are folded together to form a base 515, which may provide a stable platform to hold and balance an electronic device at various angles.

Figure 17:
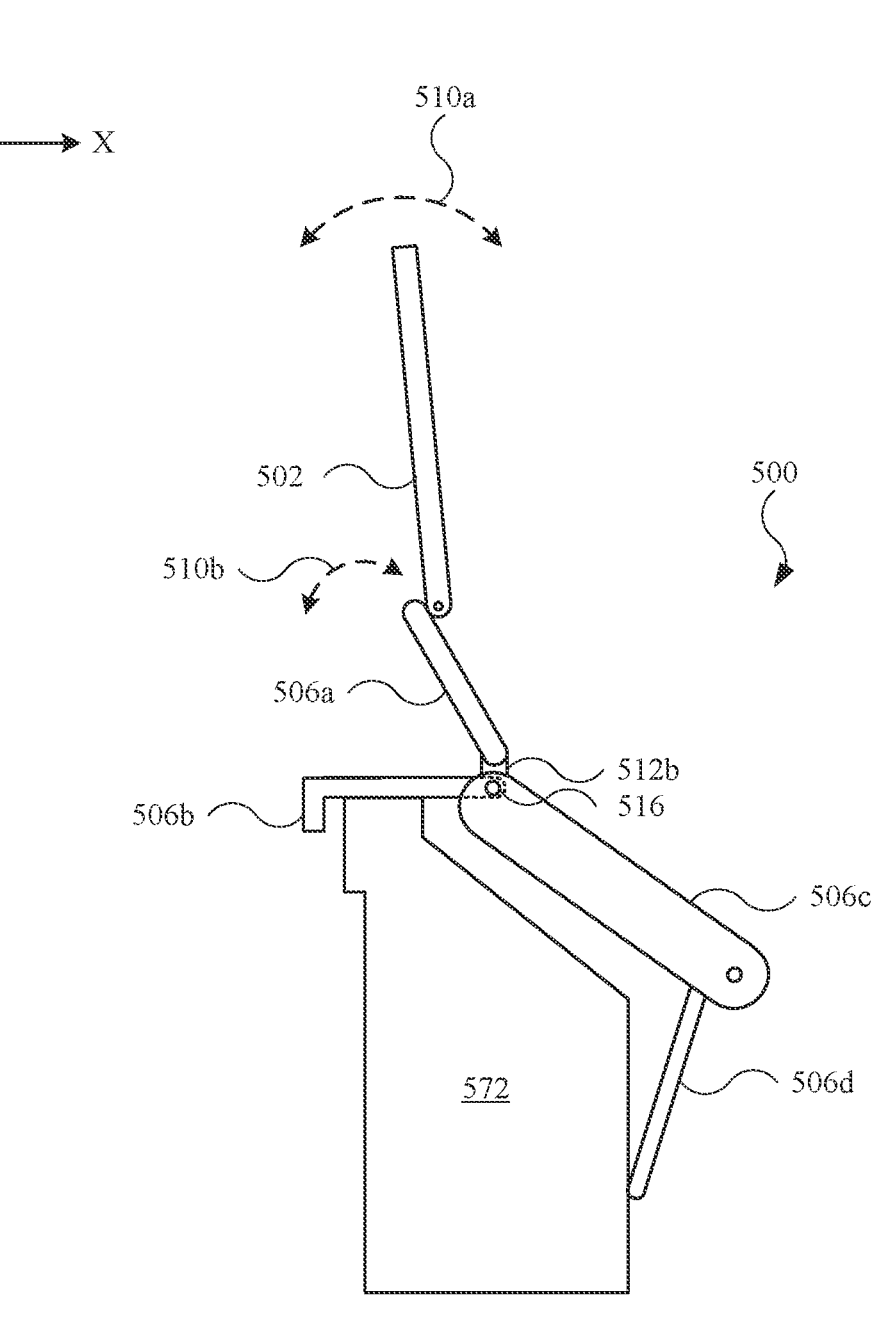

Referring to FIG. 17, arms 506a, 506b, 506c, and 506d of accessory device 500 are folded away from each other, thus allowing accessory device 500 to engage an object 572. Similar to prior embodiments, arms 506a, 506b, 506c, and 506d of accessory device 500 are rotatable, including rotatable relative to each other, to engage objects of various sizes and shapes. As shown, arm 506a is rotatable, based on clip 512b, in either direction of a two-way arrow 510b, while arm 506b is rotatable based on a hinge 516 located in arm 506c. In this regard, device holder 502, which is rotatable in either direction of two-way arrow 510a, can position an electronic device, when magnetically coupled to device holder 502, in a particular orientation, while arm 506a, which is rotatable in either direction of two-way arrow 510b, can provide an additional adjustment to device holder 502, which may include an increase or decrease in s position along a vertical direction (e.g., Z-axis of Cartesian coordinates). Thus, a position of an electronic device may be fine-tuned by, for example, movement of arm 506b while arm 506a does not rotate. Also, arm 506b may engage object 572 at one location of object 572, while arm 506d extends from arm 506c to engage another location of object 572.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An accessory device, comprising:
a first arm that carries a magnetic assembly for magnetically coupling with an electronic device;
a second arm comprising:
a surface, wherein the first arm is rotationally coupled to the second arm at the surface, and
a hook;
a third arm rotationally coupled to the second arm, the third arm comprising a first internal volume; and
a fourth arm rotationally coupled to the third arm, the fourth arm comprising a second internal volume, wherein:
a first position comprises the second arm positioned with the first internal volume and the third arm positioned in the second internal volume, and
a second position comprises the second arm extending from the first internal volume and the third arm extending from the second internal volume, thereby allowing the second arm via the hook and the third arm to secure with an object and hold the electronic device.

2. The accessory device of claim 1, wherein the hook is configured to engage the object.

3. The accessory device of claim 1, further comprising a device holder, wherein:
the magnetic assembly is located in the device holder, and
the device holder is movable with respect to the first arm.

4. The accessory device of claim 3, wherein:
the device holder comprises a disc that includes an opening, and
the first arm is located in the opening.

5. The accessory device of claim 1, further comprising a fifth arm rotationally coupled to the fourth arm.

6. The accessory device of claim 5, wherein the first position comprises the fifth arm positioned in the second internal volume.

7. The accessory device of claim 5, wherein the second position comprises the fifth arm extending from the second internal volume, thereby allowing the second arm and the fifth arm to engage the object.

8. The accessory device of claim 1, further comprising a clip located on the surface, wherein the clip is configured to secure and allow rotational movement of the first arm.

9. The accessory device of claim 8, wherein the clip is centrally located on the surface, thereby allowing the first arm to balance the electronic device, in response to magnetically coupling with the magnetic assembly, in the first position.

10. An accessory device, comprising:

a first arm;

a second arm coupled to the first arm;

a third arm rotationally coupled to the second arm, the third arm comprising a first internal volume for receiving the second arm;

a fourth arm rotationally coupled to the third arm, the fourth arm comprising a second internal volume for receiving the third arm;

a fifth arm rotationally coupled to the fourth arm, wherein:

the second arm is configured to contact a first location of an object, and the fifth arm is configured to contact a second location of the object; and a clip configured to receive the fifth arm, wherein the clip comprises an opening operable to receive a fastener and secure the clip to an object.

11. The accessory device of claim 10, further comprising a device holder coupled to the first arm, the device holder comprising a magnetic assembly for magnetically coupling with an electronic device, wherein the magnetic assembly allows rotation of the electronic device relative to the device holder.

12. The accessory device of claim 11, wherein in response to the clip being secured to the object and the fifth arm located in the clip, the first arm is configured to:

position the electronic device in a first orientation, and rotate relative to the second arm to position the electronic device in a second orientation different from the first orientation.

13. The accessory device of claim 10, wherein the second arm comprises a hook.

14. The accessory device of claim 13, wherein in response to the fifth arm being removed from the clip, the hook and the fifth arm are configured to secure with the object.

15. The accessory device of claim 10, wherein the third arm, the fourth arm, and the fifth arm are further configured to combine to form an array of arms to fit between the object and a second object.

* * * * *